US012076978B2

(12) United States Patent
Shigeta

(10) Patent No.: US 12,076,978 B2
(45) Date of Patent: Sep. 3, 2024

(54) INKJET PRINTER FOR BOTH SURFACE PRINTING AND BACK PRINTING

(71) Applicant: THINK LABORATORY CO., LTD., Chiba (JP)

(72) Inventor: Tatsuo Shigeta, Chiba (JP)

(73) Assignee: THINK LABORATORY CO., LTD., Chiba (JP)

( * ) Notice: Subject to any disclaimer, the term of this patent is extended or adjusted under 35 U.S.C. 154(b) by 0 days.

(21) Appl. No.: 16/958,030

(22) PCT Filed: Dec. 14, 2018

(86) PCT No.: PCT/JP2018/046049
§ 371 (c)(1),
(2) Date: Jun. 25, 2020

(87) PCT Pub. No.: WO2019/131204
PCT Pub. Date: Jul. 4, 2019

(65) Prior Publication Data

US 2021/0060975 A1 Mar. 4, 2021

(30) Foreign Application Priority Data

Dec. 28, 2017 (JP) ................................ 2017-253390

(51) Int. Cl.
*B41J 11/00* (2006.01)
*B41J 2/21* (2006.01)
(Continued)

(52) U.S. Cl.
CPC .......... *B41J 11/0024* (2021.01); *B41J 2/2117* (2013.01); *B41J 3/60* (2013.01); *B41J 15/04* (2013.01)

(58) Field of Classification Search
CPC ........ B41J 11/0024; B41J 2/2117; B41J 3/60; B41J 15/04; B41J 2/01; B41J 2/21; B41M 3/008
See application file for complete search history.

(56) References Cited

U.S. PATENT DOCUMENTS 3,748,747 A * 7/1973 Fleissner ................ F26B 13/16
34/115
2004/0189772 A1 9/2004 Arai
(Continued)

FOREIGN PATENT DOCUMENTS

CN 101835618 A 9/2010
CN 102991139 A 3/2013
(Continued)

OTHER PUBLICATIONS

Hanasawa, H, Ink Set, Printed Matter, Printing Method, and Printing Apparatus, Dec. 21, 2017, Japan, All (Year: 217).*
(Continued)

*Primary Examiner* — Douglas X Rodriguez
*Assistant Examiner* — Tracey M McMillion
(74) *Attorney, Agent, or Firm* — McGlew and Tuttle, P.C.

(57) ABSTRACT

Provided are an inkjet printer for both surface printing and back printing which is capable of performing both of surface printing and back printing while continuously conveying a web-shaped print base material (12) at high speed, and an inkjet printing method using the inkjet printer. The inkjet printer includes: a first white inkjet head (20*a*) configured to discharge a white aqueous ink to a surface of the web-shaped print base material (12) in a case of surface printing; a first drum-type drying unit (22*a*) configured to dry the white aqueous ink in the case of surface printing; a second white inkjet head (20*b*) configured to discharge a white aqueous ink to a surface of the web-shaped print base material (12) in a case of back printing; and a second drum-type drying
(Continued)

unit (22*b*) configured to dry the white aqueous ink in the case of back printing.

20 Claims, 3 Drawing Sheets

(51) Int. Cl.
*B41J 3/60* (2006.01)
*B41J 15/04* (2006.01)

(56) References Cited

U.S. PATENT DOCUMENTS

| | | | |
|---|---|---|---|
| 2011/0063359 A1 | 3/2011 | Buchar et al. | |
| 2011/0109673 A1 | 5/2011 | Usuda et al. | |
| 2013/0241988 A1 | 9/2013 | Mills | |
| 2015/0174924 A1 | 6/2015 | Fuchioka et al. | |
| 2016/0222240 A1* | 8/2016 | Yoneyama | C09D 11/033 |

FOREIGN PATENT DOCUMENTS

| | | | |
|---|---|---|---|
| CN | 104105599 A | | 10/2014 |
| CN | 104441973 A | | 3/2015 |
| JP | 2002-234214 A | | 8/2002 |
| JP | 2004-306591 A | | 11/2004 |
| JP | 2008246837 A | | 10/2008 |
| JP | 2011-156778 A | | 8/2011 |
| JP | 2013-203544 A | | 10/2013 |
| JP | 2014-238191 A | | 12/2014 |
| JP | 2017222744 A | * | 12/2017 |
| WO | 2013121695 A1 | | 8/2013 |
| WO | 2017/110441 A1 | | 6/2017 |

OTHER PUBLICATIONS

Takahashi, Hiroaki; Ink Set, Printed Matter, Printing Method, and Printing Apparatus, Dec. 21, 2017, Japan, All Pages (Year: 2017).*
Izawa, Hideo; Ink-Jet Recording Apparatus, Oct. 9, 2011, CA, All Pages (Year: 2011).*

* cited by examiner

INKJET PRINTER FOR BOTH SURFACE PRINTING AND BACK PRINTING

TECHNICAL FIELD

The present invention relates to an inkjet printer configured to perform image forming on a web-shaped print base material by a single-pass method with aqueous inks, and to an inkjet printing method.

BACKGROUND ART

Methods of performing printing while continuously conveying a print base material include a scanning method and a single-pass method. The single-pass method is more suitable for high-speed printing especially in the case of performing printing while continuously conveying the web-shaped print base material because there is no need to perform scanning. As an inkjet printer configured to perform image forming by a single-pass method with an aqueous ink, there has been known, for example, an inkjet printer described in Patent Document 1.

Meanwhile, in the case of performing printing on the web-shaped print base material by the single-pass method, surface printing and back printing are adopted depending on usage.

For example, in a case of performing back printing on a transparent web-shaped print base material such as a web-shaped synthetic resin film, white (W) is printed on a print surface side after printing of colors (for example, black (K), cyan (C), magenta (M), and yellow (Y)).

For example, in a case of performing surface printing on a nontransparent web-shaped print base material such as web-shaped paper or nonwoven fabric, printing of colors (for example, black (K), cyan (C), magenta (M), and yellow (Y)) is performed after printing white (W) on a print surface side.

Hitherto, an inkjet printer which is exclusive for back printing adapted to perform back printing on a web-shaped print base material by a single-pass method and an inkjet printer which is exclusive for surface printing adapted to perform surface printing on a web-shaped print base material by a single-pass method are separately prepared, and the back printing and the surface printing are respectively performed by the inkjet printers.

However, such separate preparation of the inkjet printer which is exclusive for back printing and the inkjet printer which is exclusive for surface printing requires corresponding equipment cost and installation area. For example, there has been proposed a front/back printing device as described in Patent Document 1. However, when printing is performed at a printing speed of about 30 m/min, there arises a problem of occurrence of an ink flow or color blur caused by insufficient drying of ink or occurrence of color mixing at the time of multicolor printing. Especially in a case of printing white, white requires a larger amount of ink than other colors, and hence there arises a problem in that the ink is difficult to dry, and it is very hard to increase the printing speed.

Therefore, there has been a demand for emergence of an inkjet printer which is capable of performing surface printing and back printing on a web-shaped print base material by a single-pass method and is capable of performing high-speed printing.

PRIOR ART DOCUMENT

Patent Document

Patent Document 1: WO 2017/110441
Patent Document 2: JP 2002-234214 A

DISCLOSURE OF THE INVENTION

Problems to be Solved by the Invention

The present invention has an object to provide an inkjet printer for both surface printing and back printing which is capable of performing, in a case of performing image forming on a web-shaped print base material with an aqueous ink, both of surface printing and back printing while continuously conveying a web-shaped print base material at high speed, and to provide an inkjet printing method using the inkjet printer.

Means for Solving Problems

In order to solve the problem described above, according to the present invention, there is provided an inkjet printer for both surface printing and back printing, which is capable of performing both of surface printing and back printing by discharging aqueous inks on a web-shaped print base material by a single-pass method, the inkjet printer including: a conveyance mechanism configured to perform continuous conveyance of the web-shaped print base material; a first white inkjet head configured to discharge a white aqueous ink by a single-pass method to a surface of the web-shaped print base material conveyed by the conveyance mechanism in a case of surface printing; a first drum-type drying unit configured to dry the white aqueous ink discharged by the first white inkjet head in the case of surface printing; a single-pass inkjet head configured to discharge a non-white aqueous ink to a surface of the web-shaped print base material conveyed by the conveyance mechanism in the case of surface printing and in a case of back printing; a second white inkjet head configured to discharge a white aqueous ink by a single-pass method to a surface of the web-shaped print base material conveyed by the conveyance mechanism in the case of back printing; and a second drum-type drying unit configured to dry the white aqueous ink discharged by the second white inkjet head in the case of back printing.

It is preferred that the first drum-type drying unit and the second drum-type drying unit be each a drum-type drying unit including: a housing having a heat-insulation structure with an inlet and an outlet for the web-shaped print base material; a drum body installed inside the housing; and a heating mechanism configured to heat an inside of the housing, and wherein the first drum-type drying unit and the second drum-type drying unit are each configured to dry the white aqueous ink while the web-shaped print base material is conveyed on a peripheral surface of the drum body.

According to a first aspect of the present invention, there is provided an inkjet printing method using the inkjet printer, wherein the white aqueous ink discharged by the first white inkjet head is dried so as to perform surface printing on a web-shaped print base material by a single-pass method with an aqueous ink.

Further, according to a second aspect of the present invention, there is provided an inkjet printing method using the inkjet printer, wherein the white aqueous ink discharged by the second white inkjet head is dried so as to perform back printing on a web-shaped print base material by a single-pass method with an aqueous ink.

Advantageous Effects of the Invention

The present invention exhibits the remarkable effect capable of providing an inkjet printer for both surface printing and back printing which is capable of performing, in a case of performing image forming on a web-shaped print base material with an aqueous ink, both of surface printing and back printing while continuously conveying a web-shaped print base material at high speed, and providing an inkjet printing method using the inkjet printer.

According to the present invention, in the case of performing image forming on a web-shaped print base material with an aqueous ink, even when printing is performed at a printing speed of about 30 m/min, printing can be performed without occurrence of an ink flow or color blur caused by insufficient drying of ink or occurrence of color mixing at the time of multicolor printing.

DESCRIPTION OF EMBODIMENTS

The embodiments of the present invention are described below. However, the following description describes an example, and needless to say, the present invention can be modified in various ways unless departing from the technical idea of the present invention. The same elements are denoted by the same reference symbols.

Figure 1:
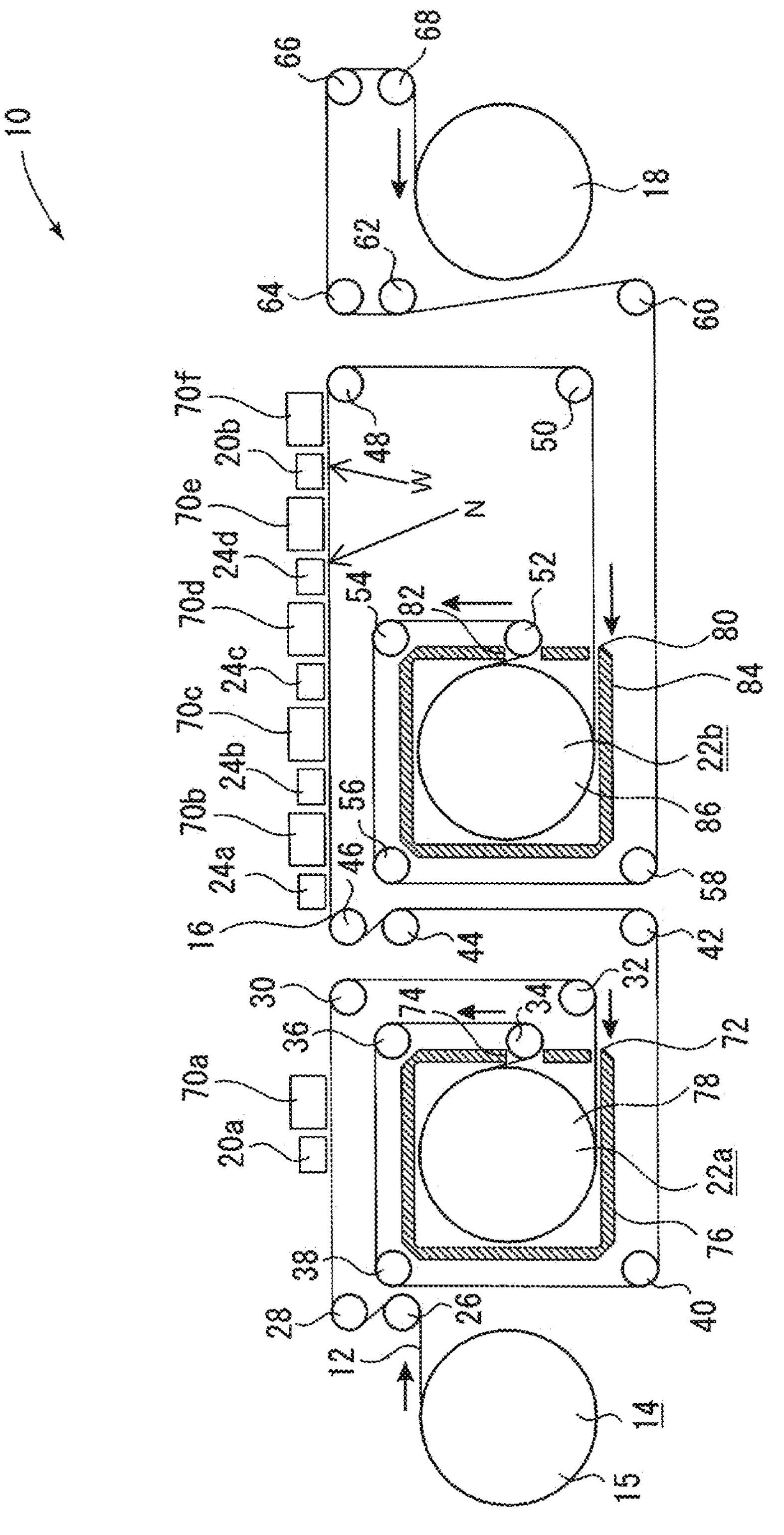
FIG. 1 is an explanatory sectional structure view for illustrating one embodiment of an inkjet printer for both surface printing and back printing according to the present invention, and is an illustration of a case in which surface printing is performed.
Figure 2:
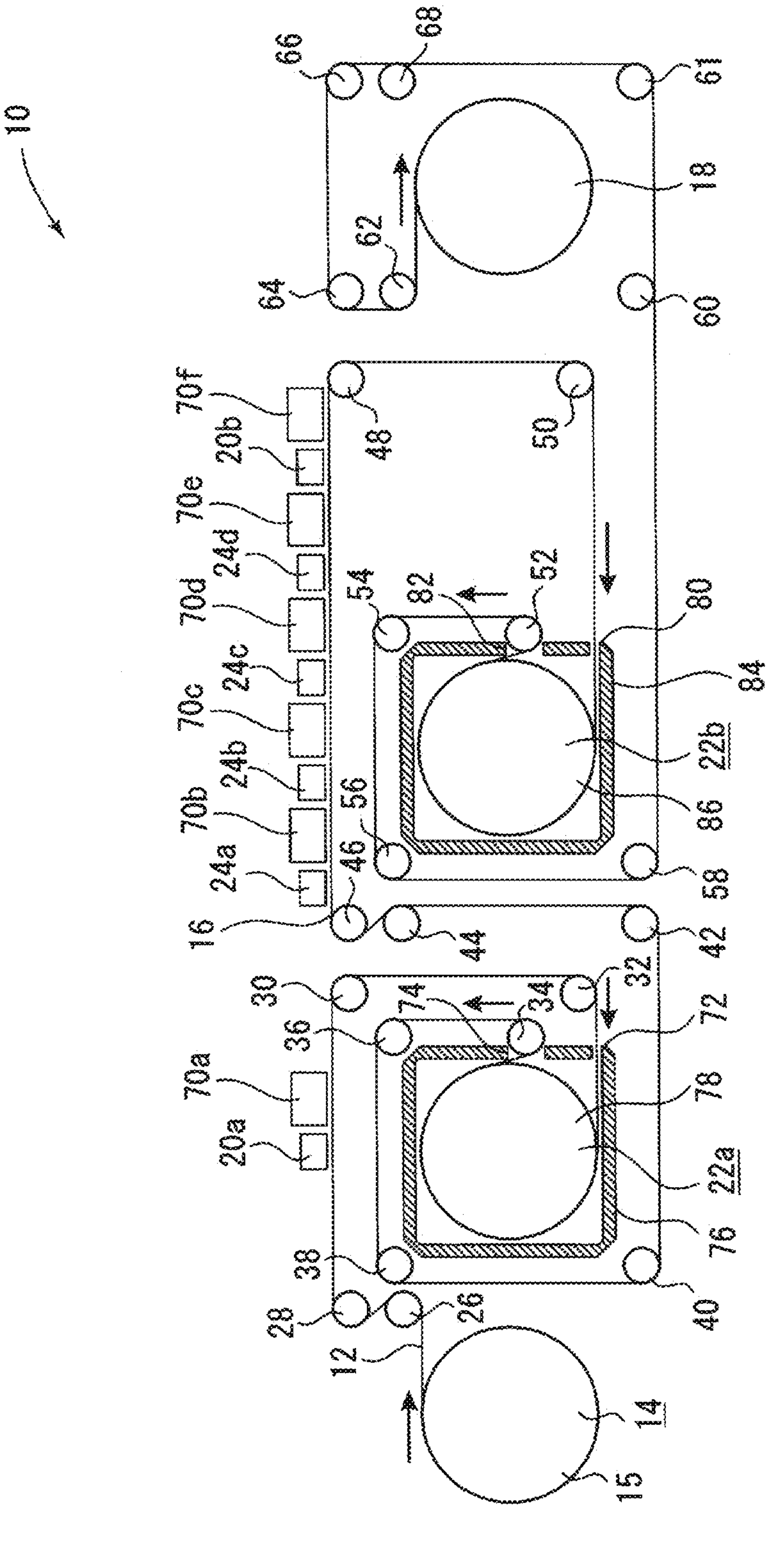
FIG. 2 is an illustration of a case in which back printing is performed with the inkjet printer for both surface printing and back printing of FIG. 1.

In FIG. 1 and FIG. 2, reference symbol 10 denotes an inkjet printer for both surface printing and back printing according to the present invention.

The inkjet printer 10 is an inkjet printer for both surface printing and back printing which is capable of performing both of surface printing and back printing by discharging aqueous inks on a web-shaped print base material 12 by a single-pass method.

The inkjet printer 10 for both surface printing and back printing includes: a conveyance mechanism 14 configured to perform continuous conveyance of the web-shaped print base material 12; a first white inkjet head 20*a* configured to discharge a white aqueous ink by a single-pass method to a surface 16 of the web-shaped print base material 12 conveyed by the conveyance mechanism 14 in a case of surface printing; a first drum-type drying unit 22*a* configured to dry the white aqueous ink discharged by the first white inkjet head 20*a* in the case of surface printing; single-pass inkjet heads 24*a* to 24*d* configured to discharge non-white aqueous inks N to the surface of the web-shaped print base material 12 conveyed by the conveyance mechanism 14 in the case of surface printing and in a case of back printing; a second white inkjet head 20*b* configured to discharge a white aqueous ink W by a single-pass method to the surface 16 of the web-shaped print base material 12 conveyed by the conveyance mechanism 14 in the case of back printing; and a second drum-type drying unit 22*b* configured to dry the white aqueous ink discharged by the second white inkjet head 20*b* in the case of back printing.

In the illustrated example, the conveyance mechanism 14 includes an unwinding portion 15 with an unwinding roll and a winding portion 18 with a winding roll. These basic configurations of the conveyance mechanism 14 to be adopted may be the same as those disclosed in Patent Document 1.

The printing with an inkjet printer involves forming a digital image with a dot group of discharged ink droplets, and hence the image forming corresponds to forming a digital image with a dot group of discharged ink droplets. Thus, in the description of the present application, printing and image forming are synonymous.

It is only required that the web-shaped print base material 12 be a print base material having a web shape. However, for example, as the web-shaped print base material, there may be applied a nontransparent web-shaped print base material such as paper or nonwoven fabric besides a transparent film. There is no particular limitation on the material for the film, and for example, a film using a synthetic resin, such as polyethylene terephthalate (PET), polyvinyl chloride (PVC), polypropylene (PP), polyethylene (PE), polystyrene (PS), or nylon (NY), may be suitably used as a web-shaped print base material for the film. Alternatively, a metal film obtained by forming a metal, such as aluminum, into a film shape may also be suitably used.

As the single-pass inkjet heads 24*a* to 24*d* configured to discharge non-white aqueous inks, in the illustrated example, illustration is given of an example with the inkjet head 24*a* corresponding to B (black), the inkjet head 24*b* corresponding to C (cyan), the inkjet head 24*c* corresponding to M (magenta), and the inkjet head 24*d* corresponding to Y (yellow). Each of the inkjet heads 24*a* to 24*d* includes an ink storage tank for each color (not shown), and an aqueous ink of each color is discharged from each of the inkjet heads 24*a* to 24*d*. A white aqueous ink is similarly discharged from the first white inkjet head 20*a* and the second white inkjet head 20*b*. Examples of the inkjet heads which can be applied include various types of publicly known single-pass inkjet discharging devices. For example, an inkjet head described in Patent Document 1 can be used as each of the inkjet heads.

Moreover, it is preferred that resolutions of the inkjet heads, specifically, the first white inkjet head 20*a*, the second white inkjet head 20*b*, and the inkjet heads 24*a* to 24*d* for non-white aqueous inks be changed in accordance with colors of the aqueous inks.

As illustrated in FIG. 1, the single-pass inkjet heads 20*a*, 20*b*, and 24*a* to 24*d* are inkjet heads each including a plurality of inkjet nozzles arranged in line. It is preferred that the plurality of single-pass inkjet heads 20*a*, 20*b*, and 24*a* to 24*d* include inkjet heads having different resolutions. In the illustrated example, the single-pass inkjet heads 20*a*, 20*b*, and 24*a* to 24*d* are inkjet heads having resolutions set in advance so as to correspond to the colors. The first white inkjet head 20*a* and the second white inkjet head 20*b* each correspond to W (white) and have a resolution of 360 dpi. The inkjet head 24*a* for a non-white aqueous ink corresponds to B (black) and has a resolution of 600 dpi. The inkjet head 24*b* for a non-white aqueous ink corresponds to C (cyan) and has a resolution of 600 dpi. The inkjet head 24*c* for a non-white aqueous ink corresponds to M (magenta) and has a resolution of 600 dpi. The inkjet head 24*d* for a non-white aqueous ink corresponds to Y (yellow) and has a resolution of 600 dpi.

For the setting of the resolutions described above, the resolution can be set through adjustment of the size of discharge ports of the plurality of inkjet nozzles installed in line, the number of discharge ports thereof (that is, the number of nozzles), and the intervals between the nozzles.

The resolutions of the inkjet heads 20*a*, 20*b*, and 24*a* to 24*d* for the colors are only required to be suitably set as needed and are not particularly limited. However, it is preferred that the resolution of the first white inkjet head 20*a* and/or the resolution of the second white inkjet head 20*b* be lower than the resolutions of the inkjet heads 24*a* to 24*d* for the non-white aqueous inks. As the resolutions of the first white inkjet head 20*a* and the second white inkjet head 20*b* are set lower than the resolutions of the inkjet heads 24*a* to 24*d* for the non-white aqueous inks, clogging of the nozzles of the inkjet heads can be prevented, and high-resolution printing can be performed.

A method of discharging inks from the nozzles of the inkjet heads 20*a*, 20*b*, and 24*a* to 24*d* is not particularly limited. For example, a piezoelectric method of controlling a voltage through application of a voltage with a piezoelectric element to control a discharge amount of ink, a thermal (bubble) method of discharging ink through heating with a heater, and a valve method of discharging ink by pressurizing ink with a valve are preferred.

Figure 3:
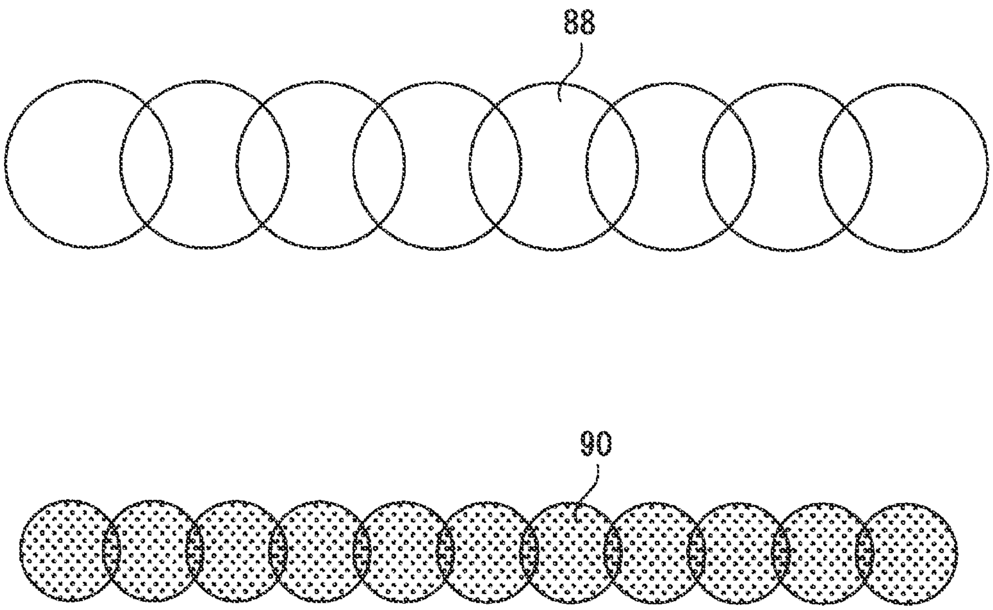
FIG. 3 is a schematic view for illustrating an example of image forming which is performed through use of the inkjet printer for both surface printing and back printing according to the present invention so that image resolutions differ in accordance with colors of aqueous inks.

FIG. 3 is a schematic view for illustrating an example of image forming which is performed through use of the inkjet printer for both surface printing and back printing according to the present invention so that the image resolutions differ in accordance with colors of aqueous inks. Reference symbol 88 denotes white images, and reference symbol 90 denotes non-white images. Conditions of image forming in FIG. 3 are shown in Table 1 below.

TABLE 1

| | White aqueous ink | Non-white aqueous inks |
|---|---|---|
| Resolution | 360 dpi | 600 dpi |
| Droplet amount | 39 pL | Small-size droplets 4 pL/ Middle-size droplets 5 pL/ Large-size droplets 6 pL |
| Nozzle pitch | 70 μm | 42 μm |
| Ink solid content | 20 wt % | 15 wt % |
| Ink viscosity (32° C.) | 12 cP | 6 cP |

With the conditions shown in Table 1, in FIG. 3, an illustration is given of an example in which image forming was performed with the resolutions of the first white inkjet head 20*a* and the second white inkjet head 20*b* set lower than the resolutions of the inkjet heads 24*a* to 24*d* for the non-white aqueous inks. Moreover, each droplet amount of the first white inkjet head 20*a* and the second white inkjet head 20*b* was set larger than each droplet amount of the inkjet heads 24*a* to 24*d* for the non-white aqueous inks, and nozzle pitches of the first white inkjet head 20*a* and the second white inkjet head 20*b* were set larger than nozzle pitches of the inkjet heads 24*a* to 24*d* for the non-white aqueous inks. Further, a white aqueous ink (W) having a solid content and a viscosity higher than those of the non-white aqueous inks (B, C, M, and Y) was used. With such a configuration, the white aqueous ink is dried faster.

As shown in FIG. 3, the resolutions of the first white inkjet head 20*a* and the second white inkjet head 20*b* are set lower than the resolutions of the inkjet heads 24*a* to 24*d* for the non-white aqueous inks so that ink droplets of the white ink become larger. Therefore, streaks or density unevenness is less liable to occur at the time of solid printing, and further clogging of the nozzles of the inkjet heads can be prevented. Furthermore, the lower resolution increases the size of the ink droplets and thus increases the density, and hence the density at a portion of single-color printing can easily be increased. Therefore, although white color is printed several times in superimposition in the case of the white ink in the related art, there is also an advantage in that such overprinting is not required.

Moreover, surface heating portions 70*a* to 70*f* which are configured to heat at least the surface 16 of the web-shaped print base material 12 having the aqueous inks discharged thereto are provided adjacent to the inkjet heads, specifically, the first white inkjet head 20*a*, the second white inkjet head 20*b*, and the inkjet heads 24*a* to 24*d* configured to discharge the non-white aqueous inks, respectively. As each of the surface heating portions 70*a* to 70*f*, for example, a surface heating portion described in Patent Document 1 can be applied. For example, a warm-air blower described in Patent Document 1 can be applied as each of the surface heating portions 70*a* to 70*f*. When the warm-air blower is adopted as each of the surface heating portions, warm air having a temperature of from about 40° C. to 80° C., for example, 70° C. is blown onto the surface of the web-shaped print base material 12. A time period of blowing the warm air is from about 1 second to 2 seconds when a printing speed is 30 m/min. However, the time period is suitably changed depending also on the temperature of the warm air.

Moreover, various rollers 26, 28, 30, 32, 34, 36, 38, 40, 42, 44, 46, 48, 50, 52, 54, 56, 58, 60, 61, 62, 64, 66, and 68 configured to convey the web-shaped print base material 12 are provided. The web-shaped print base material 12 is conveyed with the above-mentioned rollers and sent to the winding portion 18.

The first drum-type drying unit 22*a* configured to dry the white aqueous ink discharged by the first white inkjet head 20*a* in the case of surface printing is a drum-type drying unit including a housing 76, a drum body 78, and a heating mechanism (not shown). The housing 76 has a heat-insulation structure with an inlet 72 and an outlet 74 for the web-shaped print base material 12. The drum body 78 is installed inside the housing 76. The heating mechanism is configured to heat an inside of the housing 76. The first drum-type drying unit 22*a* has a configuration for drying the white aqueous ink while the web-shaped print base material 12 is conveyed on a peripheral surface of the drum body 78.

The second drum-type drying unit 22*b* configured to dry the white aqueous ink discharged by the second white inkjet head 20*b* in the case of back printing is a drum-type drying unit including a housing 84, a drum body 86, and a heating mechanism (not shown). The housing 84 has a heat-insulation structure with an inlet 80 and an outlet 82 for the web-shaped print base material 12. The drum body 86 is installed inside the housing 84. The heating mechanism is configured to heat an inside of the housing 84. The second drum-type drying unit 22*b* has a configuration for drying the white aqueous ink while the web-shaped print base material 12 is conveyed on a peripheral surface of the drum body 86.

Examples of the heating mechanism of each of the first drum-type drying unit 22*a* and the second drum-type drying unit 22*b* include a publicly known warm-air blowing mechanism. As a drying ability of the first drum-type drying unit 22*a* and the second drum-type drying unit 22*b*, it is preferred that an ability to heat the web-shaped print base material 12 to a temperature within a range of from about 50° C. to about 100° C. be given.

As described above, with the inkjet printer 10 for both surface printing and back printing according to the present invention, the web-shaped print base material 12 is allowed to pass through the first drum-type drying unit 22*a*. Therefore, even when the white which requires a larger amount of ink than other colors is discharged from the first white inkjet head 20*a* to the web-shaped print base material 12, the surface of the web-shaped print base material 12 can be dried before the next non-white aqueous inks are discharged from the inkjet heads 24*a* to 24*d*.

Moreover, the web-shaped print base material 12 is allowed to pass through the second drum-type drying unit 22*b*. Therefore, even when the white which requires a larger amount of ink than other colors is discharged from the second white inkjet head 20*b* to the web-shaped print base material 12, the surface of the web-shaped print base material 12 can be dried before the web-shaped print base material 12 is wound by the winding portion 18.

<Surface Printing>

In the case of performing the surface printing through use of the inkjet printer 10 for both surface printing and back printing according to the present invention, the inkjet printer is set so that the web-shaped print base material 12 is conveyed in the manner illustrated in FIG. 1.

In the case of the surface printing illustrated in FIG. 1, only the first white inkjet head 20*a* is used, and the second white inkjet head 20*b* is not used. Moreover, the white ink is dried through use of the first drum-type drying unit 22*a*. It is not always required that the second drum-type drying unit 22*b* be used. However, the second drum-type drying unit 22*b* is capable of quickly drying the inks discharged from the inkjet heads 24*a* to 24*d*, and hence the second drum-type drying unit 22*b* may be used as needed.

In the case of the surface printing illustrated in FIG. 1, after the white ink is discharged to the web-shaped print base material 12 from the first white inkjet head 20*a*, the white ink is dried by the first drum-type drying unit 22*a*. Next, the inks of each color being the non-white aqueous inks are discharged from the inkjet heads 24*a* to 24*d*. In the case of using the second drum-type drying unit 22*b*, after the inks are dried by the second drum-type drying unit 22*b*, the web-shaped print base material 12 is wound by the winding portion 18. In the case of not using the second drum-type drying unit 22*b*, after the inks of each color being the non-white aqueous inks are discharged from the inkjet heads 24*a* to 24*d*, the web-shaped print base material 12 is wound by the winding portion 18.

In such a manner, in the first embodiment of the inkjet printing method according to the present invention, through use of the inkjet printer 10, the white aqueous ink discharged by the first white inkjet head 20*a* is dried, and the surface printing can be performed on the web-shaped print base material 12 by the single-pass method with the aqueous ink.

<Back Printing>

In the case of performing the back printing through use of the inkjet printer 10 for both surface printing and back printing according to the present invention, the inkjet printer is set so that the web-shaped print base material 12 is conveyed in the manner illustrated in FIG. 2. In the example of FIG. 2, a roller 61 is further provided as compared to the case of the surface printing in FIG. 1, and the web-shaped print base material 12 is wound also around the roller 61. However, only the way of winding around the rollers is different, and the basic device configuration is the same.

In the case of the back printing illustrated in FIG. 2, only the second white inkjet head 20*b* is used, and the first white inkjet head 20*a* is not used. Moreover, the white ink is dried through use of the second drum-type drying unit 22*b*. The first drum-type drying unit 22*a* is not used.

In the case of the back printing illustrated in FIG. 2, after the inks of each color being the non-white aqueous inks are discharged to the web-shaped print base material 12 from the inkjet heads 24*a* to 24*d*, the white ink is discharged from the second white inkjet head 20*b*. Then, the white ink is dried by the second drum-type drying unit 22*b*, and the inks of each color being the non-white aqueous inks are also dried. After that, the web-shaped print base material 12 is wound by the winding portion 18.

In such a manner, in the second embodiment of the inkjet printing method according to the present invention, through use of the inkjet printer 10, the white aqueous ink discharged by the second white inkjet head 20*b* is dried, and the back printing can be performed on the web-shaped print base material 12 by the single-pass method with the aqueous ink.

As described above, according to the present invention, both of surface printing and back printing can be performed with one inkjet printer 10 at the time of performing image forming on the web-shaped print base material with the aqueous inks.

REFERENCE SIGNS LIST

10: inkjet printer for both surface printing and back printing of the present invention, 12: web-shaped print base material, 14: conveyance mechanism, 15: unwinding portion, 16: surface of web-shaped print base material, 18: winding portion, 20*a*: first white inkjet head, 20*b*: second white inkjet head, 22*a*: first drum-type drying unit, 22*b*: second drum-type drying unit, 24*a* to 24*d*: inkjet head for a non-white aqueous ink, 26, 28, 30, 32, 34, 36, 38, 40, 42, 44, 46, 48, 50, 52, 54, 56, 58, 60, 61, 62, 64, 66, 68: roller, 72, 80: inlet, 74, 82: outlet, 76, 84: housing, 78,86: drum body, 88: white image, 90: non-white image.

The invention claimed is:

1. An inkjet printer for both surface printing and back printing, which is capable of performing both of surface printing and back printing by discharging aqueous inks on a web-shaped print base material by a single-pass method, the inkjet printer comprising:

a conveyance mechanism configured to perform continuous conveyance of the web-shaped print base material;

a first white inkjet head configured to discharge a white aqueous ink by a single-pass method to a surface of the web-shaped print base material conveyed by the conveyance mechanism in a case of surface printing;

a first drum-type drying unit configured to dry the white aqueous ink discharged by the first white inkjet head in the case of surface printing, wherein the first drum-type drying unit is configured to receive the web-shaped print base material with only the white aqueous ink applied to the web-shaped print base material in case of surface printing, the first drum-type drying unit comprising a first drum-type housing having a first drum-type housing inlet for receiving the web-shaped print base material and a first drum-type housing outlet for the web-shaped print base material, wherein the first drum-type housing inlet and the first drum-type housing outlet are on a same side of the first drum-type housing, the first drum-type housing inlet being located at a spaced location from the first drum-type housing outlet;

a single-pass inkjet head configured to discharge a non-white aqueous ink to a surface of the web-shaped print base material conveyed by the conveyance mechanism in the case of surface printing and in a case of back printing, the non-white aqueous ink having a solid content and a viscosity that is less than a solid content and a viscosity of the white aqueous ink;

a second white inkjet head configured to discharge a white aqueous ink by a single-pass method to a surface of the web-shaped print base material conveyed by the conveyance mechanism in the case of back printing, the second white inkjet head being located downstream of the single-pass inkjet head; and a second drum-type drying unit configured to dry the white aqueous ink discharged by the second white inkjet head in the case of back printing, wherein, in case of the surface printing, the second white inkjet head is not used and, in case of the back printing, the first white inkjet head is not used.

2. The inkjet printer according to claim 1, wherein the first drum-type drying unit and the second drum-type drying unit are each a drum-type drying unit including:

a drum body; and a heating mechanism, and wherein the first drum-type drying unit and the second drum-type drying unit are each configured to dry the white aqueous ink while the web-shaped print base material is conveyed on a peripheral surface of the drum body, the drum body of the first drum-type drying unit being installed in the first drum-type drying unit housing, the first drum-type housing having a heat-insulation structure, the heating mechanism of the first drum-type drying unit being configured to heat an inside of the first drum-type drying unit housing, the second drum-type drying unit comprising a second drum-type drying unit housing having a second drum-type drying unit housing inlet for the web-shaped print base material and a second drum-type drying unit housing outlet for the web-shaped print base material, the second drum-type drying unit housing inlet and the second drum-type drying unit housing outlet being on a same side of the second drum-type drying unit housing, the second drum-type drying unit housing having a heat-insulation structure, the second drum-type drying unit comprising a second drum-type drying unit drum body installed in the second drum-type drying unit housing, the second drum-type drying unit comprising a heating mechanism configured to heat an inside of the second drum-type drying unit housing.

3. An inkjet printer of claim 2, wherein the inkjet printer is configured to carry out an inkjet printing method comprising:

drying the white aqueous ink discharged by the first white inkjet head; and performing surface printing on a web-shaped print base material by a single-pass method with an aqueous ink.

4. An inkjet printer of claim 2, wherein the inkjet printer is configured to carry out an inkjet printing method comprising:

drying the white aqueous ink discharged by the second white inkjet head; and performing back printing on a web-shaped print base material by a single-pass method with an aqueous ink.

5. An inkjet printer of claim 1, wherein the inkjet printer is configured to carry out an inkjet printing method comprising:

drying the white aqueous ink discharged by the first white inkjet head; and performing surface printing on a web-shaped print base material by a single-pass method with an aqueous ink.

6. An inkjet printer of claim 1, wherein the inkjet printer is configured to carry out an inkjet printing method comprising:

drying the white aqueous ink discharged by the second white inkjet head; and performing back printing on a web-shaped print base material by a single-pass method with an aqueous ink.

7. An inkjet printer for both surface printing and back printing, which is capable of performing both of surface printing and back printing by discharging aqueous inks on a web-shaped print base material by a single-pass method, the inkjet printer comprising:

a conveyance mechanism configured to perform continuous conveyance of the web-shaped print base material;

a first white inkjet head configured to discharge a first white aqueous ink by a single-pass method to a surface of the web-shaped print base material conveyed by the conveyance mechanism in a case of surface printing, the first white aqueous ink comprising a first white aqueous ink solid content and a first white aqueous ink viscosity;

a first drum-type drying unit configured to receive the web-shaped print base material with only the first white aqueous ink applied to the web-shaped print base material and to dry the first white aqueous ink in the case of surface printing, the first drum-type drying unit comprising a first drum-type housing having a first drum-type housing inlet for receiving the web-shaped print base material and a first drum-type housing outlet for the web-shaped print base material, wherein the first drum-type housing inlet and the first drum-type housing outlet are on a same side of the first drum-type housing, the first drum-type housing inlet being located at a spaced location from the first drum-type housing outlet;

a single-pass inkjet head configured to discharge a non-white aqueous ink to a surface of the web-shaped print base material conveyed by the conveyance mechanism in the case of surface printing and in a case of back printing, the non-white aqueous ink having a non-white aqueous ink solid content and a non-white aqueous ink viscosity, the non-white aqueous ink solid content being less than the first white aqueous ink solid content, the non-white aqueous ink viscosity being less than the first white aqueous ink viscosity;

a second white inkjet head configured to discharge a second white aqueous ink by a single-pass method to a surface of the web-shaped print base material conveyed by the conveyance mechanism in the case of back printing, the second white inkjet head being located downstream of the single-pass inkjet head; and a second drum-type drying unit configured to dry the second white aqueous ink discharged by the second white inkjet head in the case of back printing, wherein, in case of the surface printing, the second white inkjet head is not used and, in case of the back printing, the first white inkjet head is not used.

8. The inkjet printer according to claim 7, wherein the first drum-type drying unit and the second drum-type drying unit are each a drum-type drying unit including:

a drum body; and a heating mechanism, and wherein the first drum-type drying unit and the second drum-type drying unit are each configured to dry the white aqueous ink while the web-shaped print base material is conveyed on a peripheral surface of the drum body, the drum body of the first drum-type drying unit being installed in the first drum-type drying unit housing, the first drum-type housing having a heat-insulation structure, the heating mechanism of the first drum-type drying unit being configured to heat an inside of the first drum-type drying unit housing, the second drum-type drying unit comprising a second drum-type drying unit housing having a second drum-type drying unit housing inlet for the web-shaped print base material and a second drum-type drying unit housing outlet for the web-shaped print base material, the second drum-type drying unit housing inlet and the second drum-type drying unit housing outlet being on a same side of the second drum-type drying unit housing, the second drum-type drying unit housing having a heat-insulation structure, the second drum-type drying unit comprising a second drum-type drying unit drum body installed in the second drum-type drying unit housing, the second drum-type drying unit comprising a heating mechanism configured to heat an inside of the second drum-type drying unit housing.

9. An inkjet printer of claim 8, wherein the inkjet printer is configured to carry out an inkjet printing method comprising:

drying the white aqueous ink discharged by the first white inkjet head; and performing surface printing on a web-shaped print base material by a single-pass method with an aqueous ink.

10. An inkjet printer of claim 8, wherein the inkjet printer is configured to carry out an inkjet printing method comprising:

drying the white aqueous ink discharged by the second white inkjet head; and performing back printing on a web-shaped print base material by a single-pass method with an aqueous ink.

11. An inkjet printer of claim 7, wherein the inkjet printer is configured to carry out an inkjet printing method comprising:

drying the white aqueous ink discharged by the first white inkjet head; and performing surface printing on a web-shaped print base material by a single-pass method with an aqueous ink.

12. An inkjet printer of claim 7, wherein the inkjet printer is configured to carry out an inkjet printing method comprising:

drying the white aqueous ink discharged by the second white inkjet head; and performing back printing on a web-shaped print base material by a single-pass method with an aqueous ink.

13. An inkjet printer of claim 7, wherein the web-shaped print base material enters an interior of the first drum-type unit via the first drum-type unit inlet and the web-shaped print base material exiting the interior of the first drum-type unit via the first drum-type unit outlet, the second drum-type drying unit comprising a second drum-type unit inlet and a second drum-type unit outlet located on one side of the second drum-type unit, the web-shaped print base material entering an interior of the second drum-type unit via the second drum-type unit inlet and the web-shaped print base material exiting the interior of the second drum-type unit via the second drum-type unit outlet.

14. An inkjet printer for both surface printing and back printing, which is capable of performing both of surface printing and back printing by discharging aqueous inks on a web-shaped print base material by a single-pass method, the inkjet printer comprising:

a conveyance mechanism configured to perform continuous conveyance of the web-shaped print base material;

a first white inkjet head configured to discharge a first white aqueous ink by a single-pass method to a surface of the web-shaped print base material conveyed by the conveyance mechanism in a case of surface printing, the first white aqueous ink comprising a first white aqueous ink solid content and a first white aqueous ink viscosity;

a first drum-type drying unit configured to receive the web-shaped print base material with only the first white aqueous ink applied to the web-shaped print base material and to dry the first white aqueous ink in the case of surface printing, the first drum-type drying unit comprising a first drum-type housing having a first drum-type housing inlet for receiving the web-shaped print base material and a first drum-type housing outlet for the web-shaped print base material, wherein the first drum-type housing inlet and the first drum-type housing outlet are on a same side of the first drum-type housing, the first drum-type housing inlet being located at a spaced location from the first drum-type housing outlet;

a single-pass inkjet head configured to discharge a non-white aqueous ink to a surface of the web-shaped print base material conveyed by the conveyance mechanism in the case of surface printing and in a case of back printing, the non-white aqueous ink having a non-white aqueous ink solid content and a non-white aqueous ink viscosity;

a second white inkjet head configured to discharge a second white aqueous ink by a single-pass method to a surface of the web-shaped print base material conveyed by the conveyance mechanism in the case of back printing, the second white inkjet head being located downstream of the single-pass inkjet head, the second white aqueous ink comprising a second white aqueous ink solid content and a second white aqueous ink viscosity, the non-white aqueous ink solid content being less than the first white aqueous ink solid content and the second white aqueous ink solid content, the non-white aqueous ink viscosity being less than the first white aqueous ink viscosity and the second white aqueous ink viscosity; and a second drum-type drying unit configured to dry the second white aqueous ink discharged by the second white inkjet head in the case of back printing, wherein, in case of the surface printing, the second white inkjet head is not used and, in case of the back printing, the first white inkjet head is not used.

15. The inkjet printer according to claim 14, wherein the first drum-type drying unit and the second drum-type drying unit are each a drum-type drying unit including:

a drum body; and a heating mechanism, wherein the first drum-type drying unit and the second drum-type drying unit are each configured to dry the white aqueous ink while the web-shaped print base material is conveyed on a peripheral surface of the drum body, the drum body of the first drum-type drying unit being installed in the first drum-type drying unit housing, the first drum-type housing having a heat-insulation structure, the heating mechanism of the first drum-type drying unit being configured to heat an inside of the first drum-type drying unit housing, the second drum-type drying unit comprising a second drum-type drying unit housing having a second drum-type drying unit housing inlet for the web-shaped print base material and a second drum-type drying unit housing outlet for the web-shaped print base material, the second drum-type drying unit housing inlet and the second drum-type drying unit housing outlet being on a same side of the second drum-type drying unit housing, the second drum-type drying unit housing having a heat-insulation structure, the second drum-type drying unit comprising a second drum-type drying unit drum body installed in the second drum-type drying unit housing, the second drum-type drying unit comprising a heating mechanism configured to heat an inside of the second drum-type drying unit housing.

16. An inkjet printer of claim 15, wherein the inkjet printer is configured to carry out an inkjet printing method comprising:

drying the white aqueous ink discharged by the first white inkjet head; and performing surface printing on a web-shaped print base material by a single-pass method with an aqueous ink.

17. An inkjet printer of claim 15, wherein the inkjet printer is configured to carry out an inkjet printing method comprising:

drying the white aqueous ink discharged by the second white inkjet head; and performing back printing on a web-shaped print base material by a single-pass method with an aqueous ink.

18. An inkjet printer of claim 14, wherein the inkjet printer is configured to carry out an inkjet printing method comprising:

drying the white aqueous ink discharged by the first white inkjet head; and performing surface printing on a web-shaped print base material by a single-pass method with an aqueous ink.

19. An inkjet printer of claim 14, wherein the inkjet printer is configured to carry out an inkjet printing method comprising:

drying the white aqueous ink discharged by the second white inkjet head; and performing back printing on a web-shaped print base material by a single-pass method with an aqueous ink.

20. An inkjet printer of claim 14, wherein the web-shaped print base material enters an interior of the first drum-type unit via the first drum-type unit inlet and the web-shaped print base material exiting the interior of the first drum-type unit via the first drum-type unit outlet, the second drum-type drying unit comprising a second drum-type unit inlet and a second drum-type unit outlet located on one side of the second drum-type unit, the web-shaped print base material entering an interior of the second drum-type unit via the second drum-type unit inlet and the web-shaped print base material exiting the interior of the second drum-type unit via the second drum-type unit outlet.

* * * * *